United States Patent [19]

Puhl et al.

[11] Patent Number: 5,626,378
[45] Date of Patent: May 6, 1997

[54] SELF-ACTUATED VACUUM GRIP

[75] Inventors: Michael E. Puhl, Hartford; Daniel D. Dorzok, Kewaskum, both of Wis.

[73] Assignee: Vactech, Inc., Hartford, Wis.

[21] Appl. No.: 289,301

[22] Filed: Aug. 11, 1994

[51] Int. Cl.⁶ .................................................. B66C 1/02
[52] U.S. Cl. .................................. 294/64.1; 294/88
[58] Field of Search ..................... 294/64.1–65, 88; 901/40; 271/90, 94, 107

[56] References Cited

U.S. PATENT DOCUMENTS

| | | | |
|---|---|---|---|
| 575,214 | 1/1897 | Croskey et al. | 294/64.1 |
| 762,499 | 6/1904 | Sprague | 294/64.1 |
| 2,558,479 | 6/1951 | Miller | 294/64.1 |
| 2,934,086 | 4/1960 | Blatt . | |
| 3,804,397 | 4/1974 | Neumann . | |
| 4,397,491 | 8/1983 | Anderson | 294/64.1 |
| 4,763,941 | 8/1988 | Sniderman . | |
| 4,796,357 | 1/1989 | Smith . | |
| 4,995,662 | 2/1991 | Hawkswell . | |
| 5,169,192 | 12/1992 | Allison et al. . | |
| 5,308,132 | 5/1994 | Kirby et al. . | |

FOREIGN PATENT DOCUMENTS

| | | | |
|---|---|---|---|
| 738980 | 6/1980 | U.S.S.R. | 294/64.1 |
| 1046193 | 10/1983 | U.S.S.R. | 294/64.1 |
| 1684224 | 10/1991 | U.S.S.R. | 294/64.1 |

OTHER PUBLICATIONS

Western Electric Technical Digest No. 22. Apr. 1971.

*Primary Examiner*—Dean Kramer
*Attorney, Agent, or Firm*—Reinhart, Boerner, Van Deuren, Norris & Rieselbach, S.C.

[57] ABSTRACT

A self-actuated vacuum grip includes a piston mounted for back and forth movement within a chamber or cylinder. When the piston moves in one direction, it creates a partial vacuum in the chamber that can be used to grip an article. When the piston moves in the opposite direction, the partial vacuum is destroyed and the article is released. The piston is controllably moved back and forth by means of a second piston mounted in a second chamber or cylinder coaxially aligned with the first chamber and piston. The second piston is coupled to the first piston so that both pistons move as a unit. Compressed air is applied to opposite sides of the second piston to cause the second piston to move back and forth in its respective chamber. When the second piston is driven in one direction, it pulls the first piston in the same direction to create the partial vacuum. When the second piston is driven in the opposite direction, it pushes the first piston in the same direction to destroy the partial vacuum. The partial vacuum thus controllably created and destroyed is used to grip, with control, articles to be conveyed. The need for a separate vacuum line is eliminated.

6 Claims, 2 Drawing Sheets

SELF-ACTUATED VACUUM GRIP

BACKGROUND OF THE INVENTION

This invention relates generally to vacuum tools and, more particularly, to vacuum grips for controllably gripping and releasing movable objects.

One key to a successful and economical manufacturing operation is the intelligent use of automatic manufacturing methods. Many automated manufacturing operations require that a part, subassembly or finished product be physically moved from one location to another. To do this automatically requires the ability to grip an object, convey it precisely to a new location and thereafter release the object at that location. Various methods and mechanisms have evolved for achieving this goal.

One preferred approach, commonly used in handling small and delicate electronic components in the manufacture of electronic devices and circuitry, is the use of a partial vacuum to grip the objects or articles to be moved. Vacuum gripping is advantageous in that it minimizes the physical stress placed on the conveyed object, avoids marring or otherwise affecting the appearance of the conveyed object, and is conveniently controlled to permit quick and easy release of the conveyed object. Various types of vacuum gripping devices are shown, for example, in the following U.S. Patents:

| Patent No. | Title | Inventor |
| --- | --- | --- |
| 5,169,192 | Electronic Article Pickup Tool | Allison, et al. |
| 5,308,132 | Circuit Assembly Device for Programmably Controlling Placement Force and Method Thereto | Kirby, et al. |
| 4,995,662 | Suction Pickup Apparatus for Electrical or Electronic Components | Hawkswell |
| 4,796,357 | Method and Apparatus for Positioning Electrical Components | Smith |
| 4,763,941 | Automatic Vacuum Gripper | Sniderman |
| 3,804,397 | Automatic Positioning Vacuum Cup | Newmann |
| 2,934,086 | Vacuumatic Valve | Blatt |

These devices generally rely on external vacuum pumps to create a partial vacuum that is controllably valved through, or blocked by, the device to grip and release the object to be conveyed. Although effective, the need for an external vacuum source in addition to external control circuitry or linkages adds to the complexity and cost of the overall system, provides another area for potential system malfunction and further complicates overall system maintenance. A need therefore exists for a vacuum grip device that is simple, effective, reliable and economical in manufacture and use.

SUMMARY OF THE INVENTION

The invention provides a vacuum grip including a chamber having first and second ends and an aperture formed adjacent the first end. The vacuum grip further includes a piston disposed within the chamber moveable between the first and second ends and further includes a controllable actuator for selectably moving the piston from the first end of the chamber to the second end of the chamber and from the second end of the chamber to the first end. The piston thereby creates a partial vacuum in the chamber adjacent the first end when the piston moves from the first end toward the second end. The piston destroys the partial vacuum in the chamber adjacent the first end when the piston moves from the second end towards the first end. The partial vacuum thereby created is communicated through the aperture to grip and release objects in accordance with the position of the piston within the chamber.

The invention also provides a self-actuated vacuum grip that includes an elongate housing having a hollow interior and a partition dividing the hollow interior into first and second chambers. A first piston is positioned for reciprocation in the first chamber and a second piston is positioned for reciprocation in the second chamber. Structure is provided for coupling the first and second pistons for co-linear movement with each other so that reciprocating movement of the second piston in the second chamber results in reciprocating movement of the first piston in the first chamber. Structure is also provided for selectively reciprocating the second piston in the second chamber. The first piston thereby moves creating a partial vacuum in the first chamber when the first piston is moved in one direction and destroying the partial vacuum when the first piston is moved in the opposite direction.

The invention also provides a self-actuated vacuum grip including a housing defining an elongate cylindrical hollow interior, a partition dividing the hollow interior into first and second chambers, a first piston in the first chamber dividing the first chamber into first and second subchambers and a second piston in the second chamber dividing the second chamber into first and second subchambers. The self-actuated vacuum grip further includes a link extending through the partition linking the first piston with the second piston so that linear movement of the second piston in the second chamber results in linear movement of the first piston in the first chamber. A first air inlet port in the housing in fluid communication with the first subchamber of the second chamber is provided for introducing compressed air to one side of the second piston in order to drive the second piston in one direction in the second chamber. A second air inlet port is provided in the housing in fluid communication with the second subchamber of the second chamber for introducing compressed air to the other side of the second piston to drive the second piston in the other direction in the second chamber. A partial vacuum port is provided in the housing in fluid communication with one of the first or second subchambers of the first chamber and a vacuum suction cup is provided in fluid communication with the partial vacuum port for engaging an article to be gripped by the vacuum grip. The remaining subchamber of the first chamber is vented to the atmosphere.

It is an object of the present invention to provide a new and improved vacuum grip that is simple, reliable, effective and economical in manufacture and use.

It is a further object of the present invention to provide a vacuum grip that does not require an externally generated partial vacuum.

It is a further object of the present invention to provide a new an improved vacuum grip that generates its own partial vacuum.

It is a further object of the present invention to provide a new and improved vacuum grip that generates its own partial vacuum in response to a single control input.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
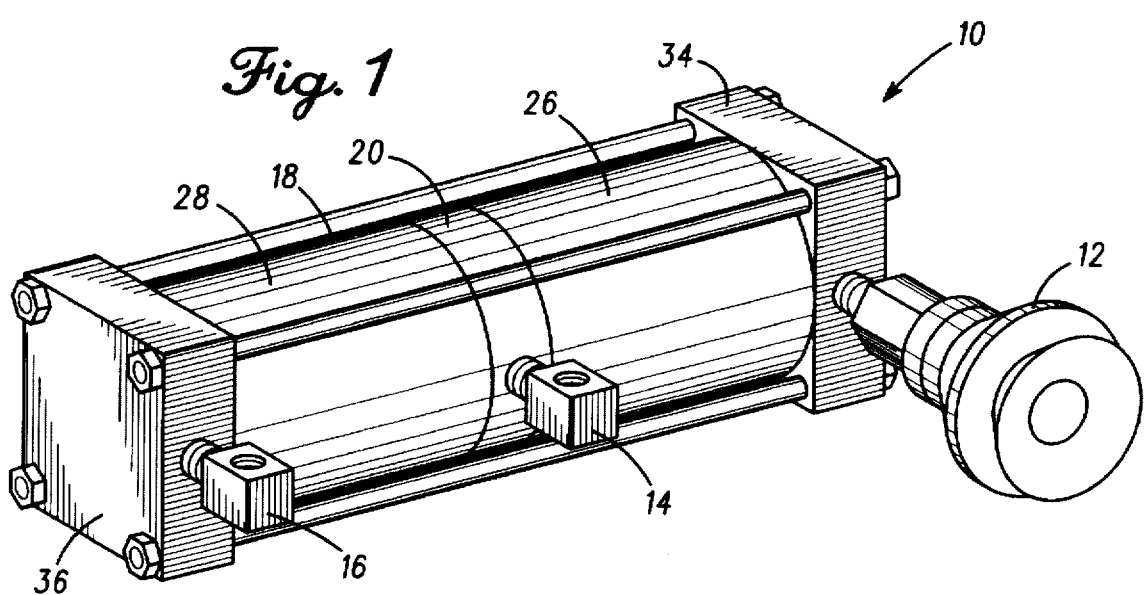
FIG. 1 is a perspective view of a self-actuated vacuum grip embodying various features of the invention.
Figure 3:
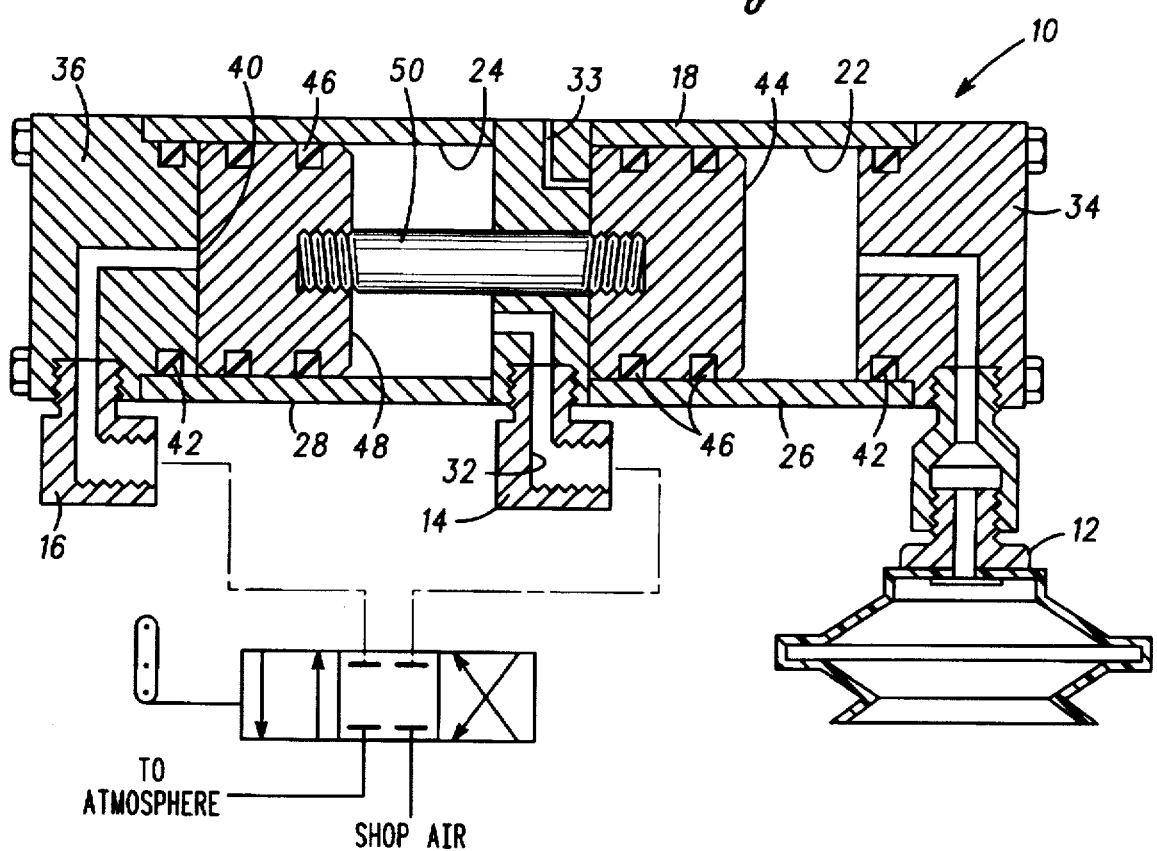
FIG. 3 is a cross-sectional view of the self-actuated vacuum grip shown in FIGS. 1 and 2, useful in understanding the construction and operation thereof.
Figure 2:
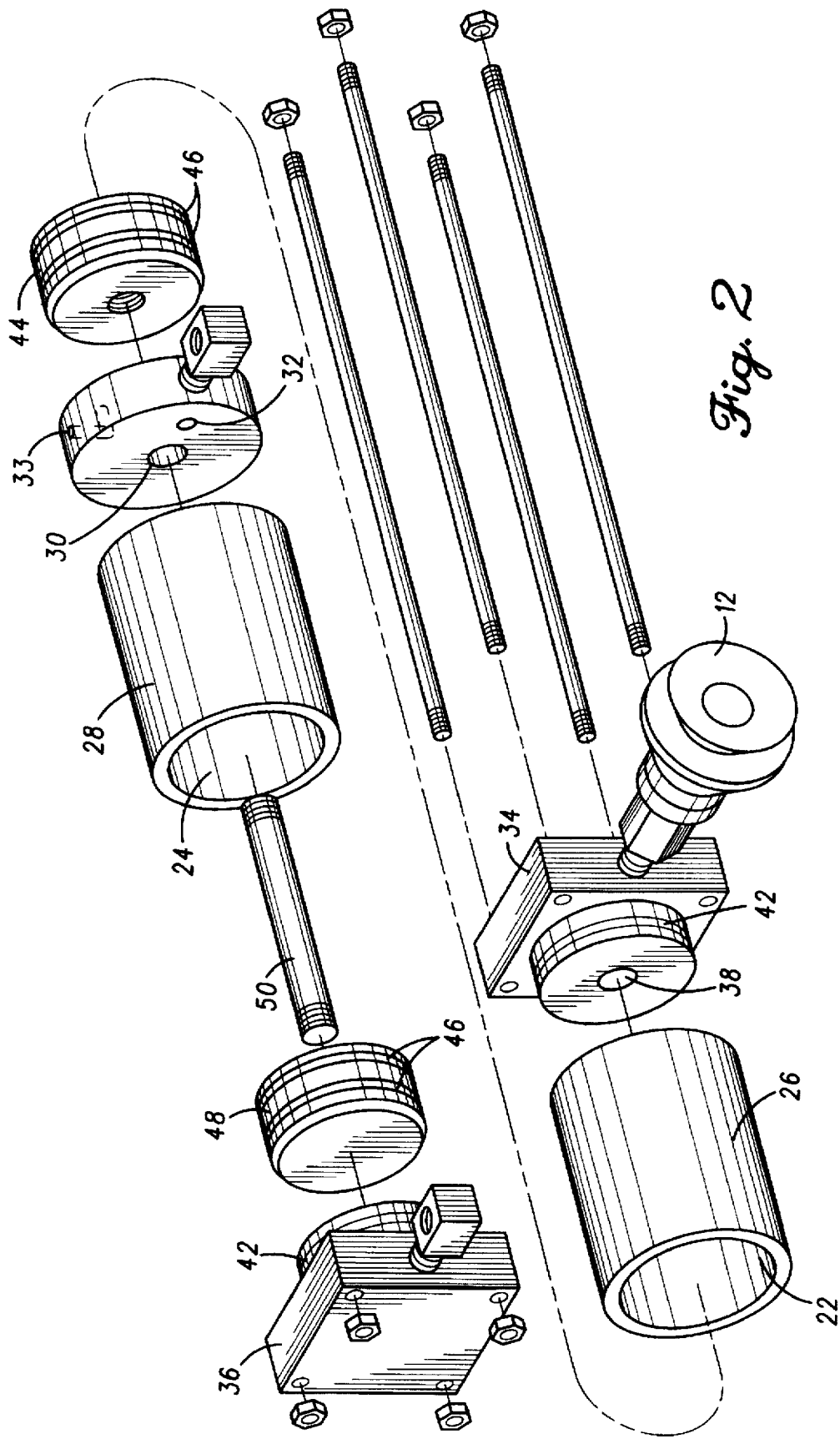
FIG. 2 is an exploded perspective view of the self-actuated vacuum grip shown in FIG. 1.

A self-actuated vacuum grip 10 embodying various features of the invention is shown in FIGS. 1, 2 and 3. The self-actuated vacuum grip 10 generally comprises an elongate structure having a soft, pliable plastic or rubber suction cup 12 at one end thereof. The self-actuated vacuum grip 10 further includes a first air inlet port 14 at about the middle of the self-actuated vacuum grip 10 and a second air inlet port 16 at the end of the self-actuated vacuum grip 10 opposite the suction cup 12. The self-actuated vacuum grip 10 functions broadly to provide a partial vacuum at the suction cup 12 when compressed air is applied at the first air inlet port 14 and to remove the partial vacuum at the suction cup 12 when compressed air is applied at the second air inlet port 16 and vented from the first air inlet port 14. The partial vacuum thus created and destroyed at the suction cup 12 can be used for selectively gripping articles to be transported.

When the suction cup 12 is placed against an object or article to be transported and compressed air is applied to the first air inlet port 14, the partial vacuum thus created sucks the object against the suction cup 12. When the partial vacuum is removed or destroyed by applying compressed air to the second air inlet port 16, the device 10 releases its grip allowing the conveyed object to fall away. The self-actuated vacuum grip 10 can be used in a variety of applications, such as automated manufacture, wherein conveyed articles are gripped, transported to a new location and then released at the new location.

The self-actuated vacuum grip 10 generally includes an elongate housing 18 having a hollow interior and having a partition 20 dividing the hollow interior into first and second chambers 22, 24. In the illustrated embodiment, the housing 18 is substantially cylindrical and defines a substantially cylindrical hollow interior. The housing includes two cylindrical sleeves 26, 28 that are separated by the partition 20. The partition comprises a disk-shaped member that is sandwiched between the ends of the sleeves 26, 28. The partition 20 includes a central axial passageway or aperture 30 that is aligned with the central axis of the housing 18 and further includes an interior passageway 32 that communicates the first air inlet port 14 with the second chamber 24 of the housing 18. An additional passageway 33 formed in the partition 20 vents the innermost end of the first chamber 22 to the atmosphere. The sleeves 26,28 and the partition 20 are, in turn, sandwiched between a pair of opposed end caps 34, 36 that engage and seal off the remaining ends of the sleeves 26, 28. The first end cap 34 includes an interior passageway 38 that communicates the suction cup 12 with the forwardmost end of the first chamber 22. The second end cap 36 includes an interior passageway 40 that communicates the second air inlet 16 with the aftermost end of the second chamber 24. Preferably, the outermost ends of the passageways 38, 40 in the first and second end caps 34, 36, and the passageway 32 in the partition 20, are internally threaded to receive standard air fittings. The first and second end caps 34, 36 and the partition 20 are precisely fitted to form airtight seals where they engage the first and second sleeves 26, 28. Seals 42 can also be provided to ensure a tight fit and avoid the leakage of air.

A piston 44 is disposed within the first chamber 22 and is reciprocable therein. The piston 44 divides the first chamber 22 into first and second subchambers. The relative sizes of the first and second subchambers vary depending upon the position of the piston 44 within the first chamber 22. The piston 44 forms an airtight seal where it engages the interior side walls of the first chamber 22 and preferably includes one or more seals 46 to ensure a close, airtight seal between the piston 44 and the chamber or cylinder walls.

It will be appreciated that movement of the piston 44 within the first chamber 22 varies the air pressure within the chamber 22. For example, when the first piston 44 moves from the right hand end of the first chamber 22 to the left hand end of the first chamber 22 as shown in FIG. 3, a partial vacuum is formed in the first chamber 22 causing air to be sucked through the suction cup 12. Air in the first chamber on the left hand side of the piston 44 is vented through the passageway 33. If an object is pressed against the suction cup 12 at that time, the partial vacuum thus created will cause the vacuum grip 10 to grip the object. Similarly, movement of the piston 44 from the left to the right as shown in FIG. 3 will destroy the partial vacuum thereby releasing the object. A controllable actuator is provided for selectively moving the piston 44 from one end of the first chamber 22 to the other end of first chamber 22 to selectively create and destroy a partial vacuum in the first chamber 22.

In the illustrated embodiment, movement of the first piston 44 is controlled by means of a second piston 48 reciprocably mounted in the second chamber 24. The second piston 48, which can be similar or identical to the first piston 44, is coupled to the first piston 44 by means of a link 50 extending through the aperture 30 in the partition 20. The link 50 is rigid so that the two pistons 44, 48 move as a unit. The second piston 48 divides the second chamber 24 into first and second subchambers whose respective volumes vary in accordance with the position of the second piston 48 in the second chamber 24. When compressed air is applied to the first air inlet port 14, the second piston 48 is driven toward the left hand side of the second chamber 24 as shown in FIG. 3. This has the effect of pulling the first piston 44 to the left hand side of the first chamber 22 thereby creating a partial vacuum in the first chamber 22. When compressed air is applied to the second inlet port 16 (and vented from the first air inlet port 14) the second piston 48 is driven toward the right hand side of the second chamber 24 thereby forcing the first piston 44 to the right hand side of the first chamber 22. This destroys the partial vacuum previously created in the first chamber 22 and causes the vacuum grip 10 to release its grip on any conveyed article it may be carrying. By controlling the application and venting of compressed air at the first and second air inlets 14, 16, the self-actuated vacuum grip device 10 can be made to grip and release articles at will.

In an alternate form of the invention, the second air inlet port 16 can be eliminated and a compression spring or other resilient structure can be provided between the second piston 48 and the second end cap 36. When compressed air is applied to the first air inlet 14, the piston 48 is driven against the spring thereby compressing the spring. When the air pressure is released at the first air inlet 14, the spring returns the pistons 48, 44 to their initial positions thereby removing the partial vacuum at the suction cup 12. Such an alternative embodiment simplifies controlling the self-actuated vacuum grip 10 by eliminating the need for a second air line to the self-actuated vacuum grip 10 and by eliminating the need for complicated valving in association with the compressed air supply.

The self-actuated vacuum grip 10 herein shown and described is a simple, effective unit that is reliable in operation and that can be mass manufactured easily and inexpensively. By eliminating the need for an external vacuum source, the self-actuated vacuum grip 10 can be easily and economically incorporated into various automated systems. Although the illustrated embodiment is preferably formed of machined metal components, it will be appreciated that, because of the simple, uncomplicated design of the various components, the self-actuated vacuum grip 10 can also be manufactured economically from injection molded plastics and similar materials. Furthermore, although an actuator comprising a piston 48 driven by compressed air has been shown and described, other forms of actuators, such as an electrically controlled solenoid, can be used to drive the first piston 44 in either direction in the first chamber 22.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A self-actuated vacuum grip comprising:
   an elongate housing having a hollow interior and having a partition dividing said hollow interior into first and second chambers;
   a first piston reciprocable in said first chamber;
   a second piston reciprocable in said second chamber;
   means for coupling said first and second pistons for colinear movement with each other so that reciprocating movement of said second piston in said second chamber results in reciprocating movement of said first piston in said first chamber; and
   means for selectively reciprocating said second piston in said second chamber so as to reciprocate said first piston in said first chamber;
   said first piston thereby creating in said first chamber a partial vacuum when said first piston is moved in one direction and said first piston destroying said partial vacuum when said first piston is moved in the opposite direction.

2. A self-actuated vacuum grip as defined in claim 1 wherein said means for coupling said first and second pistons comprises a rigid link.

3. A self-actuated vacuum grip as defined in claim 2 wherein said means for selectively reciprocating said second piston comprises air inlet ports communicating with opposite sides of said second piston.

4. A self-actuated vacuum grip as defined in claim 3 wherein said hollow interior is of substantially cylindrical form.

5. A self-actuated vacuum grip as defined in claim 5 wherein said elongate housing is of substantially cylinder form.

6. A self-actuated vacuum grip comprising:
   a housing defining an elongate cylindrical hollow interior;
   a partition dividing said hollow interior into first and second chambers;
   a first piston in said first chamber dividing said first chamber into first and second subchambers;
   a second piston in said second chamber dividing said second chamber into first and second subchambers;
   a link extending through said partition linking said first piston with said second piston so that linear movement of said second piston in said second chamber results in linear movement of said first piston in said first chamber;
   a first air inlet port in said housing in fluid communication with said first subchamber of said second chamber for introducing compressed air to one side of said second piston to drive said second piston in one direction in said second chamber;
   a second air inlet port in said housing in fluid communication with said second subchamber of said second chamber for introducing compressed air to the other side of second piston to drive said second piston in the other direction in second chamber;
   a partial vacuum port in said housing in fluid communication with one of said first or second subchambers of said first chamber; and
   a vacuum suction cup in fluid communication with said partial vacuum port for engaging an article to be gripped by the vacuum grip.

* * * * *

UNITED STATES PATENT AND TRADEMARK OFFICE
CERTIFICATE OF CORRECTION

PATENT NO. : 5,626,378
DATED      : May 6, 1997
INVENTOR(S) : Puhl, et al.

It is certified that error appears in the above-indentified patent and that said Letters Patent is hereby corrected as shown below:

Column 4, Line 50: omit "fight" and insert --right--;
Column 6, Line 11: omit "claim 5" and insert --claim 4--.

Signed and Sealed this

Twenty-third Day of September, 1997

Attest:

BRUCE LEHMAN

Attesting Officer

Commissioner of Patents and Trademarks